United States Patent
Kahle et al.

(12) 
(10) Patent No.: US 6,298,436 B1
(45) Date of Patent: Oct. 2, 2001

(54) METHOD AND SYSTEM FOR PERFORMING ATOMIC MEMORY ACCESSES IN A PROCESSOR SYSTEM

(75) Inventors: James Allan Kahle; Hung Qui Le; Larry Edward Thatcher; David James Shippy, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/327,644

(22) Filed: Jun. 8, 1999

(51) Int. Cl.[7] .............. G06F 9/305; G06F 9/38; G06F 9/44
(52) U.S. Cl. ............ 712/220; 712/23; 712/245; 712/237; 712/217; 712/235; 712/239
(58) Field of Search .................... 712/214, 216, 712/206, 225, 229, 220, 217, 213, 219, 215, 239, 218, 235, 247, 237, 23, 1, 245, 240

(56) References Cited

U.S. PATENT DOCUMENTS 5,649,225 * 7/1997 White et al. ................... 712/23
5,764,942   6/1998 Kahle et al. .................. 712/214
6,018,798 * 1/2000 Witt et al. .................... 712/220

\* cited by examiner

*Primary Examiner*—Daniel H. Pan
(74) *Attorney, Agent, or Firm*—Anthony V. S. England; Bracewell & Patterson, L.L.P.

(57) ABSTRACT

A method and system for atomic memory accesses in a processor system, wherein the processor system is able to issue and execute multiple instructions out of order with respect to a particular program order. A first reservation instruction is speculatively issued to an execution unit of the processor system. Upon issuance, instructions queued for the execution unit which occur after the first reservation instruction in the program order are flushed from the execution unit, in response to detecting any previously executed reservation instructions in the execution unit which occur after the first reservation instruction in the program order. The first reservation instruction is speculatively executed by placing a reservation for a particular data address of the first reservation instruction, in response to completion of instructions queued for the execution unit which occur prior to the first reservation instruction in the program order, such that reservation instructions which are speculatively issued and executed in any order are executed in-order with respect to a partnering conditional store instruction.

11 Claims, 4 Drawing Sheets

METHOD AND SYSTEM FOR PERFORMING ATOMIC MEMORY ACCESSES IN A PROCESSOR SYSTEM

BACKGROUND OF THE INVENTION

1. Technical Field

The present invention relates in general to an improved data processing system and in particular to an improved method and system for performing atomic memory accesses in a processor system. Still more particularly, the present invention relates to an improved method and system for speculatively issuing and executing reservation instructions and partnering conditional store instructions.

2. Description of the Related Art

Designers of modern state-of-the-art data processing systems are continually attempting to enhance performance aspects of such systems. One technique for enhancing data processing efficiency is the achievement of short cycle times and a low Cycles-Per-Instruction (CPI) ratio. In superscalar processor systems, cycle times and CPI ratios are decreased by the simultaneous issuance and execution of multiple instructions. Typically multiple instructions are simultaneously executed through multiple fixed point and floating point instruction execution units which are pipelined in nature. In view of the pipelined nature of processors, in such systems care must be taken to ensure that a result from a particular instruction which is necessary for execution of a subsequent instruction is obtained prior to dispatching the subsequent instruction. In other words, care must be taken to prevent out-of-order execution of particular instructions.

Many techniques have been developed in order to restrict the dispatching of instructions and ensure that "data dependency hazards" due to out-of-order execution do not occur. By one method, the dispatching of a particular instruction is restricted until such time as all preceding instructions in a program order have been dispatched. While this technique ensures that data dependency hazards will not occur, the performance penalty encountered utilizing this technique is substantial.

By another method, the data dependency hazards which occur with simultaneous execution of multiple instructions in each processor cycle have also been addressed by utilizing an approach known as "register renaming." Register renaming is a technique utilized to temporarily place the results of a particular instruction into a register for potential use by later instructions prior to the time the final result from an instruction is placed within a register file. Register renaming is generally accomplished by providing a register file array with extra locations and a pointer arrangement to identify particular physical registers which have been assigned to logical registers. Selected prior art approaches also utilize multiple register file arrays to provide many "read" ports for data or for holding previous results for backup in the case of exceptions.

While register renaming provides the ability to simultaneously dispatch and execute multiple instructions where serial execution might otherwise be necessary, a problem exists with the dispatching of instructions to execution units utilizing such techniques. The requirement that an instruction utilize particular data or operands for execution has generally rendered it impossible to dispatch an instruction and associated data to an execution unit within a single processor cycle, since the dispatch unit, or the execution unit must generally perform a complex read through a lookup table or pointer system to determine which temporary register contains the required data for execution of the instruction.

In order to reduce the cycles needed to dispatch instructions, another method of dispatching instructions has been developed. The method utilizes "serialization" of data which ensures that the execution of these instructions follows rules for maintaining sequential execution of instructions. Intermediate storage buffers are provided for storing the result of an instruction for utilization by other execution units or for future transfer to a general purpose register. By this method, the maintaining of complex lookup tables typically associated with register renaming schemes is not required and thereby instructions may be dispatched within a single processor cycle.

In particular, reservation instructions and partnering conditional store instructions require in-order execution with respect to each other and thereby have been serialized in execution in prior art processor systems. These instructions are often referred to as load and reserve indexed (LARX) instructions and store conditional indexed (STCX) instructions. In particular LARX instructions create a reservation for a particular address for use by a partnered STCX instruction in order to assert an atomic operation. The reservation is checked for validity and the STCX instruction is performed only if the reservation is found valid. The reservation may be lost if other processors or I/O devices reference the address prior to the STCX instruction execution.

In serializing instructions, certain types of instructions may wait many cycles before being issued. In particular, LARX/STCX instructions are often held for multiple cycles before being issued until all instructions upon which the LARX instruction is dependent are executed and complete. In addition, if prior storage references located before the selected LARX instruction according to the program order have not been completed, then the dispatch of any storage references after the LARX instruction are inhibited until the LARX instruction is executed. In some cases, a LARX instruction and those storage references following may wait an undesirable number of cycles before being issued for execution.

From the foregoing, it is apparent that there is a need for a method of issuing LARX instructions such that in-order execution with respect to STCX instructions is maintained, however the instruction does not wait multiple cycles before being issued. Thereby, there is a need to issue and execute LARX instructions in a speculative manner while still maintaining the necessary order of execution with respect to STCX instructions to reduce the number of cycles in which LARX instructions are stalled in issue and execution units.

SUMMARY OF THE INVENTION

It is therefore one object of the present invention to provide an improved data processing system.

It is another object of the present invention to provide an improved method and system performing atomic memory accesses in a processor system.

It is yet another object of the present invention to provide an improved method and system for speculatively issuing and executing reservation instructions and partnering conditional store instructions with a selective flush.

The foregoing objects are achieved as is now described. The method and system of the present invention may be utilized to perform atomic memory accesses in a processor system, wherein the processor system is able to issue and execute multiple instructions out of order with respect to a particular program order. A first reservation instruction is speculatively issued to an execution unit of the processor system. Upon issuance, instructions queued for the execution unit which occur after the first reservation instruction in the program order are flushed from the execution unit, in response to detecting any previously executed reservation instructions in the execution unit which occur after the first reservation instruction in the program order. The first reservation instruction is speculatively executed by placing a reservation for a particular data address of the first reservation instruction, in response to completion of instructions queued for the execution unit which occur prior to the first reservation instruction in the program order, such that reservation instructions which are speculatively issued and executed in any order are executed in-order with respect to a partnering conditional store instruction.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
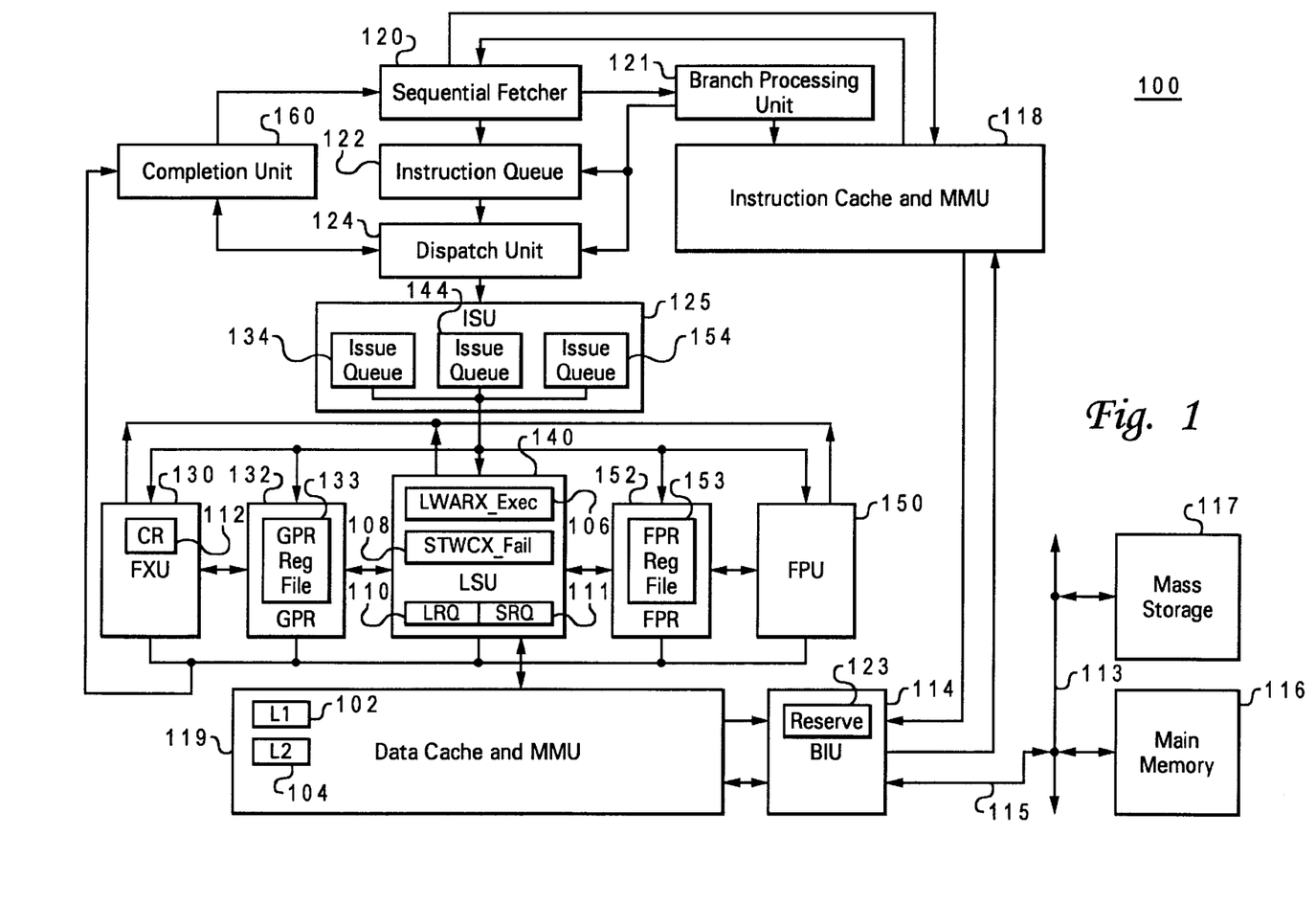
FIG. 1 depicts a block diagram representation of a superscalar data processing system which may be utilized to implement the method and system of the present invention.

With reference now to the figures and in particular with reference now to FIG. 1, there is illustrated a processor 100. Processor 100 may be a PowerPC RISC processor, wherein in the PowerPC RISC processor instruction set, LARX and STCX instructions are further designated as load word and reserve indexed (LWARX) and store word conditional indexed (STWCX) instructions. A description of the LWARX and STWCX is incorporated herein by reference to the PowerPC Architecture Manual and in particular section 1.8.2 therein. Further, other processors with other instruction sets may implement similar instructions such as LARX and STCX instructions or others which provide for atomic memory accesses to memory from multiple processors while maintaining memory coherence.

In the illustrative embodiment shown in FIG. 1, processor 100 comprises a single integrated circuit superscalar microprocessor. Accordingly, processor 100 includes various execution units, registers, buffers, memory devices, and other functional units, which are all formed by integrated circuitry. Of course, although the invention is described herein as applied to a microprocessor, the present instruction handling scheme is not limited to microprocessors and may be implemented in other types of processors.

Processor 100 includes issue unit (ISU) 125 which will be described in detail below. ISU 125 gives execution units 130, 140 and 150 the ability to reject instructions. Rejected instructions remain in ISU 125 to be reissued at a later time.

As illustrated in FIG. 1, processor 100 is coupled to system bus 113 via bus interface unit (BIU) 114 and processor bus 115. Both system bus 113 and processor bus 115 include address, data, and control buses which are not shown separately. BIU 114 participates in bus arbitration to control the transfer of information between processor 100 and other devices coupled to system bus 113, such as main memory 116 and non-volatile mass storage 117. The data processing system illustrated in FIG. 1 preferably includes other devices coupled to system bus 113; however, these other devices are not necessary for an understanding of the invention and are accordingly omitted from the drawings so as not to obscure the invention in unnecessary detail.

In addition, BIU 114 includes a reserve register 123 which establishes a valid reservation for a particular data address. Typically, a LARX instruction will place a reservation in reserve register 123 for a particular data address. A valid reservation in reserve register 123 will be lost if any intervening remote store to the reservation address occurs on system bus 113. A remote store is the result of other processors or input/output (I/O) devices referencing the address established by the LARX instruction, prior to the STCX instruction which references the address.

BIU 114 is connected to instruction cache and MMU (memory management unit) 118 and data cache and MMU 119. High-speed caches, such as level one (L1) cache 102 and level two (L2) cache 104, within data cache and MMU 119, enable processor 100 to achieve relatively fast access times to a subset of data or instructions previously transferred from main memory 116 to the caches, thus improving the overall processing speed. Data and instructions stored within the data cache 119 and instruction cache 118, respectively, are each identified and accessed by an effective address, which is related to the real address of the respective data or instructions in main memory 116.

Instruction cache and MMU 118 is further coupled to sequential fetcher 120, which fetches instructions for execution from instruction cache and MMU 118 during each processor cycle. Sequential fetcher 120 transmits branch instructions fetched from instruction cache and MMU 118 to branch processing unit (BPU) 121 for execution, and temporarily stores sequential instructions within instruction queue 122 for eventual transfer to dispatch unit 124 for decoding and dispatch to instruction issue unit (ISU) 125.

In the depicted illustrative embodiment, in addition to BPU 121, the execution circuitry of processor 100 comprises multiple execution units for executing sequential instructions, including fixed-point unit (FXU) 130, load-store unit (LSU) 140, and floating-point unit (FPU) 150. Each execution unit 130, 140 and 150 typically executes one or more instructions of a particular type during each processor cycle.

FXU 130 performs fixed-point mathematical and logical operations such as addition, subtraction, ANDing, ORing, and XORing, utilizing source operands received from specified general purpose registers (GPRs) 132. Following the execution of a fixed point instruction, FXU 130 outputs the data results of the instruction on result bus 128 to a GPR register file 133 associated with GPRs 132. Further, a condition register (CR) 112 within FXU 130 maintains the control bits which indicate the condition of instructions within GPRs 132.

FPU 150 typically performs single and double precision floating-point mathematical and logical operations, such as floating-point multiplication and division, on source operands received from floating-point registers (FPRs) 152. FPU 150 outputs data resulting from the execution of floating-point instructions on result bus 128 to a FPR register file 153, which temporarily stores the result data.

LSU 140 typically executes floating-point and fixed-point instructions which either load data from memory or which store data to memory. For example, an LSU instruction may load data from either the data cache and MMU 119 or main memory 116 into selected GPRs 132 or FPRs 152. Other LSU instructions may store data from a selected GPR 132 or FPR 152 to main memory 116. For example, a LARX instruction may cause a data load into selected GPRs 132 or FPRs 152 when executed. Further, a STCX instruction may store data from a selected GPR 132 or FPR 152 to main memory 116 if enabled by a proper reservation.

To handle LARX/STCX instructions and in particular to handle the speculative issue of LARX instructions in accordance with the method and system of the present invention, LSU 140 also includes flags LARX_Exec 106 and STCX_Fail 108. LARX_Exec flag 106 tracks the speculative execution of LARX instructions as will be further described in FIG. 2. STCX_Fail 108 may force the reservation for a STCX instruction to fail as will also be further described in FIG. 3. Further, LSU 140 includes a load reorder queue (LRQ) 110 and store reorder queue(SRQ) 111. LSU 140 tracks the program order of all load instructions in LRQ 110, holds pending stores and executes stores in program order based on a completion unit pointer in SRQ 111.

Processor 100 employs both pipeline and out-of-order execution of instructions to further improve the performance of its superscalar architecture. As is typical of high-performance processors, each sequential instruction is processed at five distinct pipeline stages, namely, fetch, decode/dispatch, execute, finish and completion. Instructions can be executed by FXU 130, LSU 140 and FPU 150 in any order as long as data dependencies are observed. Within individual execution units, 130, 140 and 150, instructions are also processed in a sequence of pipeline stages unique to the particular execution unit.

During the fetch stage, sequential fetcher 120 retrieves one or more instructions associated with one or more memory addresses from instruction cache and MMU 118. Sequential fetcher 120 stores sequential instructions fetched from instruction cache and MMU 118 within instruction queue 122. The sequential instructions being fetched are provided in a particular program order which indicates the sequentiality of the instructions. Branch instructions are removed or folded out by sequential fetcher 120 to BPU 121 for execution. BPU 121 includes a branch prediction mechanism (not shown separately) which, in one embodiment, comprises a dynamic prediction mechanism such as a branch history table. This branch history table enables BPU 121 to speculatively execute unresolved conditional branch instructions by predicting whether or not the branch will be taken.

During the decode/dispatch stage, dispatch unit 124 decodes and dispatches one or more instructions from instruction queue 122 to ISU 125. ISU 125 includes a plurality of issue queues 134, 144, and 154, one issue queue for each execution unit 130, 140, and 150. ISU 125 also includes circuitry for receiving information from each execution unit 130, 140, and 150 and for controlling the issue queues 134, 144 and 154. According to the invention, instructions for each respective execution unit 130, 140, and 150 are stored in the respective issue queues 134, 144, and 154, and then issued to the respective execution unit to be processed. However, instructions are dropped or removed from the issue queues 134, 144 and 154 only after the issued instruction is fully executed by the respective executions unit 130, 140, and 150.

During the execution stage, execution units 130, 140 and 150 execute instructions issued from their respective issue queues 134, 144 and 154. As will be described below, each execution unit according to the invention may reject any issued instruction without fully executing the instruction. However, once the issued instructions are executed and that execution has terminated, execution units 130, 140 and 150 store the results, if any, within either GPRs 132 or FPRs 152, depending upon the instruction type. Execution units 130, 140, and 150 also notify completion unit 160 that the instructions have finished execution. Finally, instructions are completed in program order out of a completion buffer (not shown separately) associated with the completion unit 160. Instructions executed by FXU 130 are completed by releasing the old physical register associated with the destination GPR of the completed instructions in GPR rename table (not shown). Instructions executed by FPU 150 are completed by releasing the old physical register associated with the destination FPR of the completed instructions in a FPR rename table (not shown). Load instructions executed by LSU 140 are completed by releasing the old physical register associated with the destination GPR or FPR of the completed instructions in the FPR or FPR rename table (not shown). Store instructions executed by LSU 140 are completed by marking the finished store instructions as completed in SRQ 111.

The invention will be described below with reference specifically to one execution unit, LSU 140, along with ISU 125 and issue queue 144. However, those skilled in the art will appreciate that the same speculative instruction technique described below with reference to LSU 140 may also be employed with FXU 130 and FPU 150, or with any other execution unit associated with a processor. Also, the operation of the units is described specifically for the speculative execution of LARX/STCX instructions, however other instruction types may also be speculatively executed by the methods shown.

As will be discussed in detail below, LARX instructions may be speculatively issued from issue queue 144 for speculative execution by LSU 140 without being restrained by serialization. However, when a present LARX instruction is issued to LSU 140, if any other LARX instructions which occur after the present LARX instruction in the program order have been previously executed, a selective flush of all instructions after the present LARX instruction in the program order from LRQ 110 must be performed. In addition, an issued LARX instruction may be rejected from LSU 140 and returned to ISU 125, if there are other instructions in LSU 140 which occur prior to the present LARX instruction in the program order. By flushing any LARX instructions which occur after the present LARX instruction in program order which have been previously executed and by rejecting issued LARX instructions from LSU 140 until they are the oldest instruction in the program order, speculative issue and execution of LARX instructions may be performed while also maintaining in-order execution with respect to partnering STCX instructions. Most importantly, speculative issue and execution of LARX instructions reduces the time that LARX instructions are retained in issue queue 144 and increases the performance of processor 100 in processing LARX/STCX instructions.

Figure 2A:
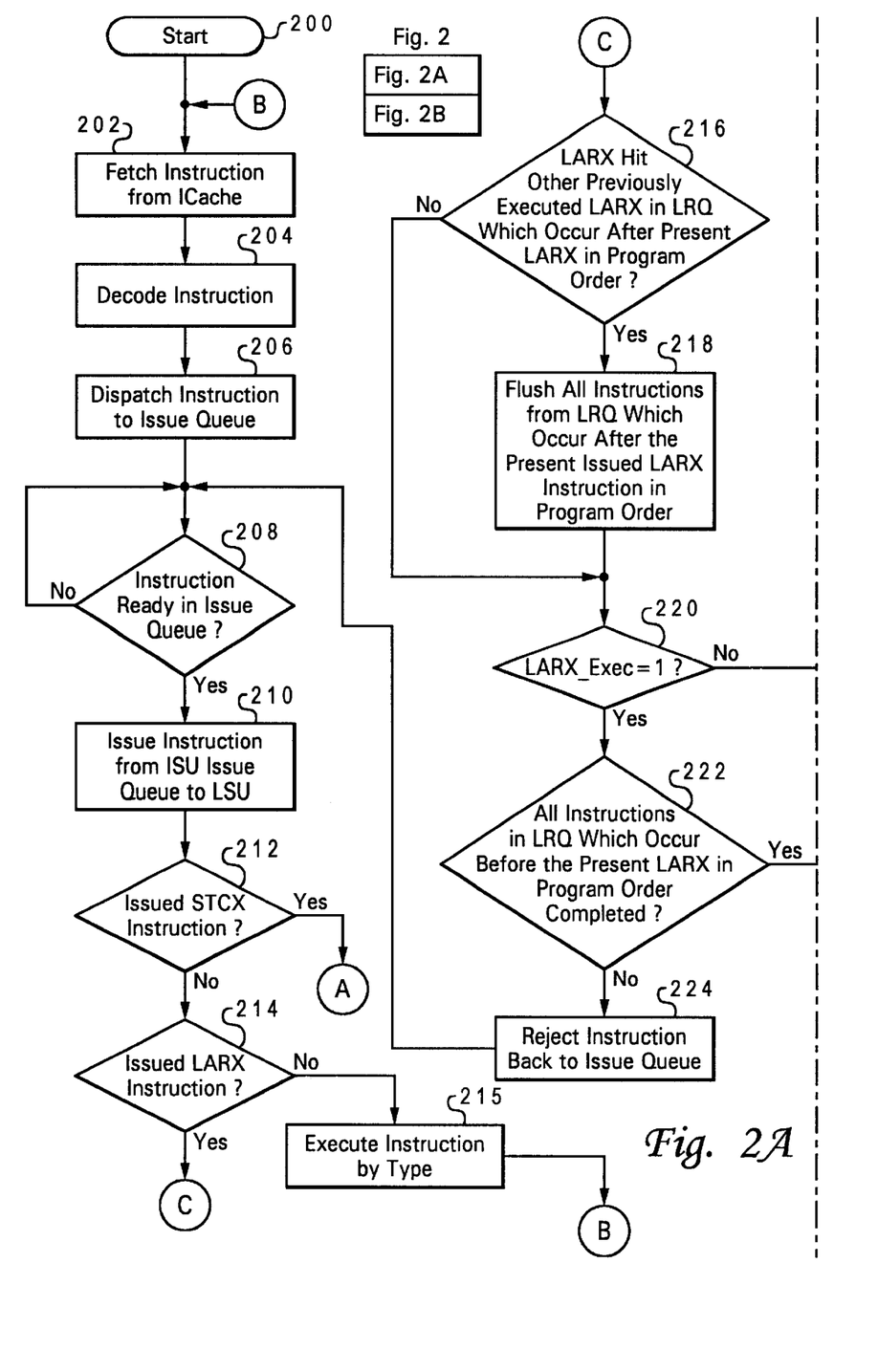
FIG. 2 illustrates a high level logic flowchart of a process for properly executing LARX instructions.
Figure 2B:
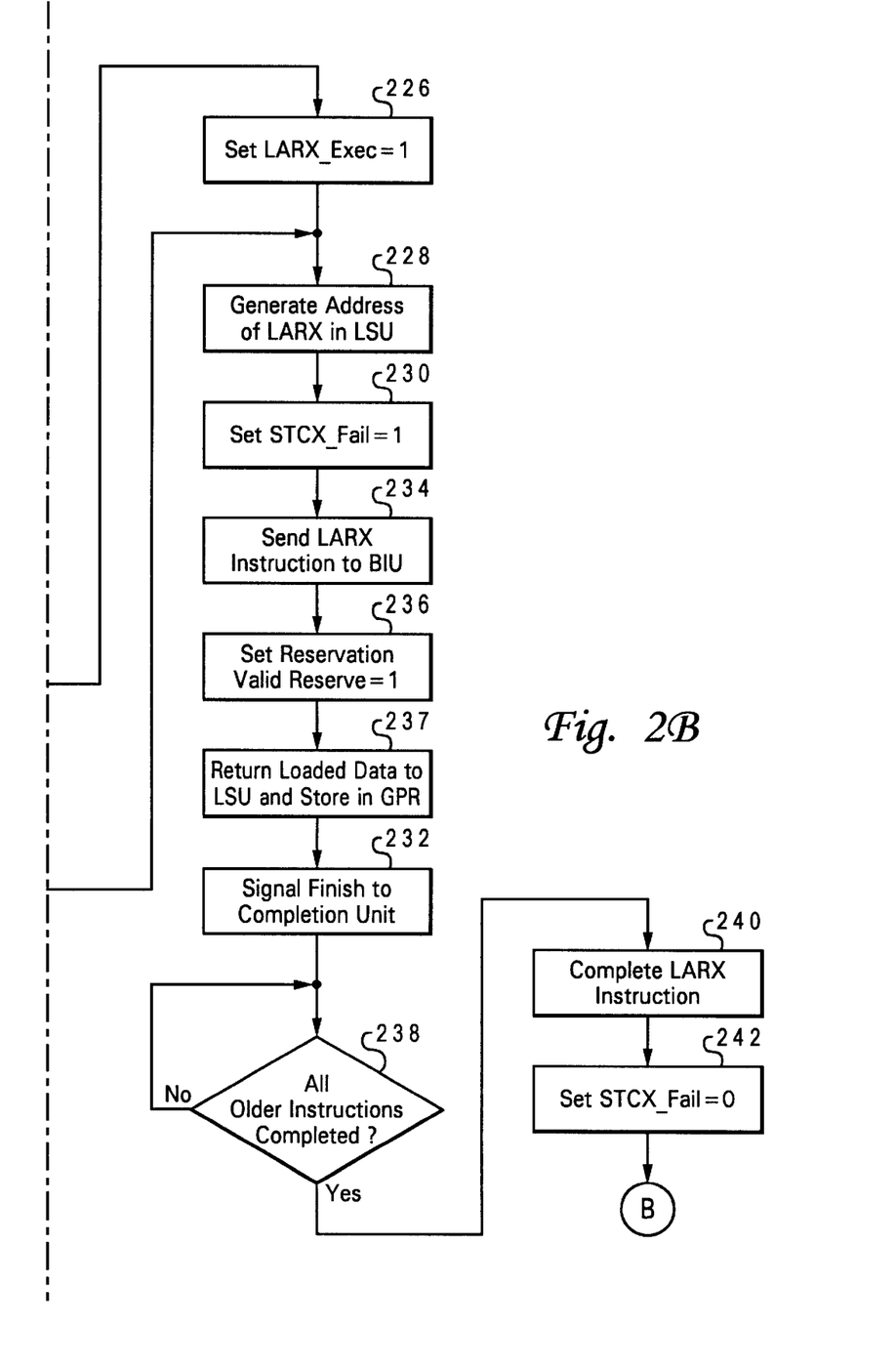

Referring now to FIG. 2, there is illustrated a high level logic flowchart of a process for speculatively executing LARX instructions. As depicted, the process starts at block 200 and proceeds to block 202. Block 202 depicts fetching an instruction from the instruction cache by the sequential fetcher. For the process depicted, it is assumed that the instruction being fetched will be a load/store type of instruction which will be issued to the LSU. Thereafter, block 204 illustrates decoding the instruction. Next, block 206 depicts dispatching the instruction to an issue queue. Thereafter, block 208 illustrates a determination of whether the instruction is ready in the issue queue to be issued. In particular, LARX/STCX instructions are ready to be issued if all instructions upon which the instruction is dependent have been issued. If the instruction is not ready to be issued, the process iterates at block 208. If the instruction is ready to be issued, the process passes to block 210. By speculatively issuing the instruction if all dependencies have been issued, it is not necessary to wait until a LARX instruction is the oldest instruction in the issue queue or all dependencies have been executed before issuing the LARX instruction.

Block 210 depicts speculatively issuing the instruction from an issue queue to the LSU. Next, block 212 illustrates a determination of whether the issued instruction is a STCX instruction. If the instruction is a STCX instruction, the process passes to "A" which is continued on FIG. 3. If the instruction is not a STCX instruction, the process passes to block 214. Block 214 depicts a determination of whether the issued instruction is a LARX instruction. If the issued instruction is not a LARX instruction, then the process passes to block 215. Block 215 illustrates executing the instruction by type which may call other processes out of the scope of the present invention which are performed by the LSU. If the issued instruction is a LARX instruction, the process passes to block 216.

Block 216 illustrates a determination of whether the present LARX instruction hits other LARX instructions which occur after the present LARX instruction in the program order that were previously executed in the LRQ of the LSU. If the presently issued LARX instruction hits other LARX instructions which occur after the present LARX instruction in the program order that were previously executed, the process passes to block 218. Block 218 depicts flushing all instructions from the LRQ which are occur after the present LARX instruction in the program order. By flushing all instructions which occur after the present LARX instruction in the program order, the chance of out-of-order execution of LARX instructions with respect to partnering STCX instructions is eliminated. Thereafter, the process passes to block 220. If the presently issued LARX instruction does not hit other LARX instructions which occur after the present LARX instruction in the program order that were previously executed, the process passes directly to block 220.

Block 220 depicts a determination of whether the LARX_Exec variable is set to "1". When LARX_Exec is set to "1", an indication is provided that a LARX instruction has been executed for which the corresponding STCX instruction has not been executed or that a LARX instruction is being executed. If the LARX_Exec variable is set to "1", then the process passes to block 222. Block 222 illustrates a determination of whether all instructions in the LSU which occur before the present LARX instruction in the program order, are completed. If all instructions in the LSU which occur before the present LARX instruction in the program order are completed, the process passes to block 228. If not all instructions in the LSU which occur before the present LARX instruction in the program order are completed, the process passes to block 224. Block 224 depicts rejecting the LARX instruction back to the issue queue whereafter the process passes to block 208. In particular, in order for new LARX instructions to be speculatively executed, if LARX_Exec is set to "1", all other instructions which have been issued to the LSU which occur before the present LARX instruction in the program order must be completed.

Returning to block 220, if the LARX_Exec variable is not set to "1", then the process passes to block 226. Block 226 illustrates setting the LARX_Exec variable to "1". Thereafter, block 228 depicts generating the data address for a load from the LARX instruction in the LSU. Next, block 230 illustrates setting a STCX_Fail variable to "1". Thereafter, block 234 illustrates sending the data address of the LARX instruction to the BIU. Next, block 236 depicts setting the reservation valid reserve in the BIU to "1"and reserving the data address therein. In addition, block 237 illustrates returning the loaded data to the LSU to store in the GPR. The data is loaded from a data storage device off the system bus. Next, block 232 depicts signaling a finish to the completion unit whereby the LSU indicates to the completion unit that the LARX instruction has executed. Thereafter, the process passes to block 238.

Block 238 illustrates a determination of whether all instructions which occur before the present LARX instruction in the program order are completed. If all instructions which occur before the present LARX instruction in the program order are not completed, the process iterates at block 238. If all instructions which occur before the present LARX instruction in the program order are completed, the process passes to block 240. Block 240 depicts the completion of the LARX instruction. The completion data indicates that the instruction may be retired. Thereafter, block 242 illustrates setting the STCX_Fail variable to "0". Thereafter, the process returns to block 202.

Figure 3:
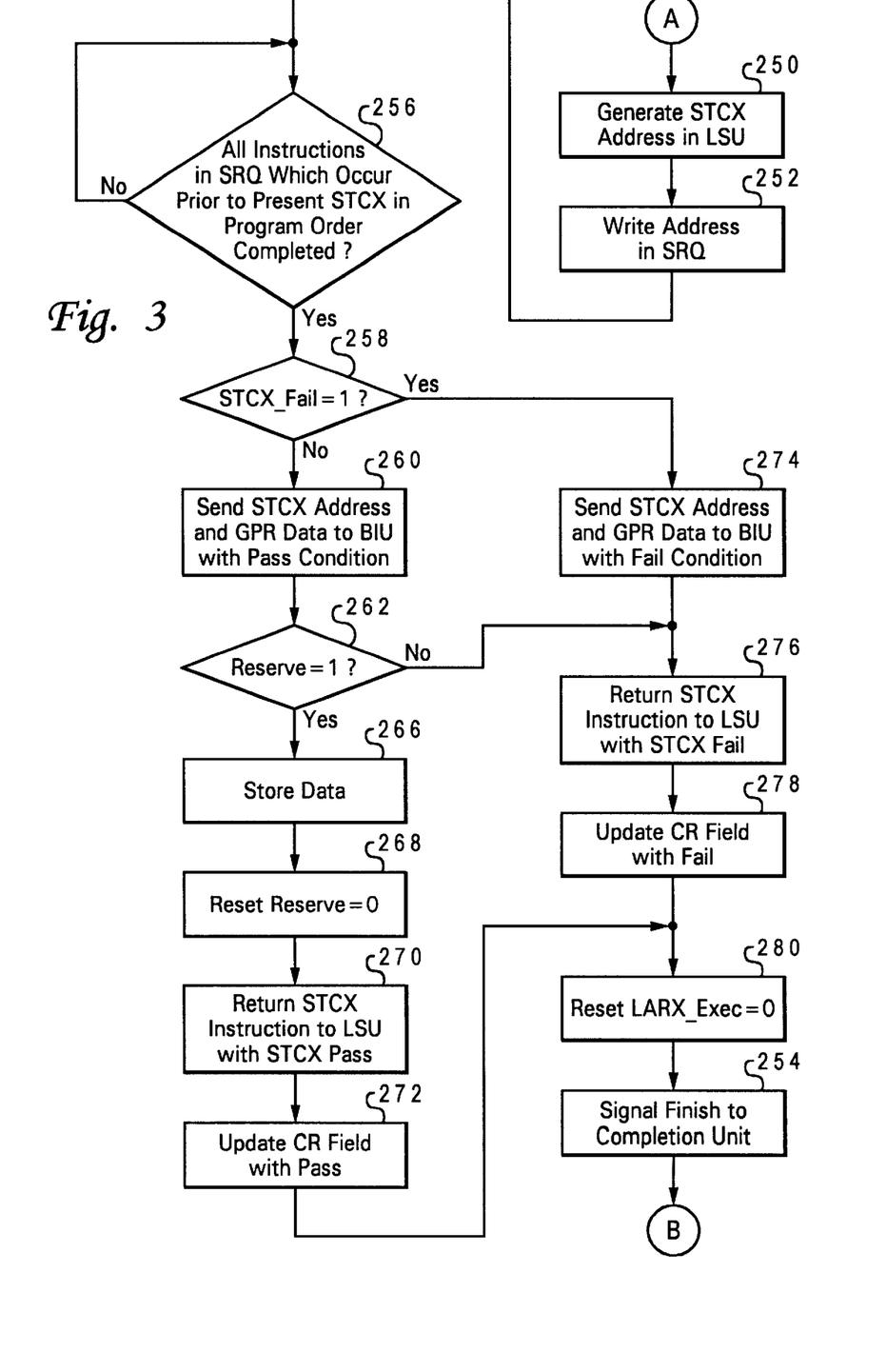
FIG. 3 depicts a high level logic flowchart of a process for properly executing STCX instructions.

With reference now to FIG. 3, there is depicted a high level logic flowchart of a process for properly executing STCX instructions. As illustrates, the process continues at "A" from FIG. 2 and proceeds to block 250. Block 250 depicts the generation of the data address for the STCX instruction in the LSU. The data address indicates where data should be stored by the STCX instruction. Thereafter, block 252 illustrates writing the data address in the SRQ. Thereafter, the process passes to block 256.

Block 256 depicts the determination of whether all STCX instructions in the LSU which occur before the present STCX instruction in the program order are completed. If not all STCX instructions in the LSU which occur before the present STCX instruction in the program order are completed, the process iterates at block 256. If all STCX instructions in the LSU which occur before the present STCX instruction in the program order are completed, the process passes to block 258. Block 258 illustrates the determination of whether the STCX_Fail variable is set to "1". If the variable is not set to "1", the process passes to block 260. Block 260 depicts sending the STCX data address and data from the GPR to the BIU with a pass condition. The pass condition indicates that the store part of the atomic operation may continue if all other following conditions are also met. Thereafter, block 262 illustrates a determination of whether the reserve validity is set to "1"for the data address. If the reserve validity is set to "1", the process passes to block 266. Block 266 depicts storing the data of the STCX instruction in the appropriate memory location as indicated by the data address. Thereafter, block 268 illustrates resetting the reserve validity to "0". Next, block 270 depicts returning the STCX instruction to the LSU with STCX pass signaled whereby the STCX instruction may be retired from the SRQ. Thereafter, block 272 illustrates updating the CR field with a pass for the instruction. The CR field provides an indicator that a STCX instruction has passed or failed which may be utilized in programming LARX/STCX sequences. Next, the process passes to block 280.

Returning to block 258, if the STCX_Fail variable is set to "1", the process passes to block 274. Block 274 depicts sending the STCX data address to the BIU with a fail condition. A fail condition indicates that the store portion of the atomic operation will not be performed yet. Thereafter, the process passes to block 276.

Returning to block 262, if the reserve validity is not set to "1", the process passes to block 276. Block 276 illustrates returning the STCX instruction to the LSU with STCX fail signaled. Thereafter, block 278 depicts updating the CR field with a failure. When a failure occurs, the LARX and STCX instructions must be reissued in order to retry the atomic operation. Thereafter, block 280 illustrates resetting the LARX_Exec variable to "0". Next, block 254 depicts signaling a finish to the completion unit indicting that the STCX instruction has been executed whereafter the process returns to "B" in FIG. 2.

While the invention has been particularly shown and described with reference to a preferred embodiment, it will be understood by those skilled in the art that various changes in form and detail may be made therein without departing from the spirit and scope of the invention.

We claim:

1. A method for atomic memory accesses in a processor system, wherein said processor system is able to issue and execute a plurality of instructions out of order with respect to a particular program order, said method comprising the steps of:

speculatively issuing a first reservation instruction to an execution unit of a processor system;

flushing instructions queued for said execution unit which occur after said first reservation instruction in said program order, in response to detecting any previously executed reservation instructions in said execution unit which occur after said first reservation instruction in said program order; and speculatively executing said first reservation instruction by placing a reservation for a particular data address of said first reservation instruction, in response to completion of instructions queued for said execution unit which occur prior to said first reservation instruction in said program order, such that reservation instructions which are speculatively issued and executed in any order are executed in-order with respect to a partnering conditional store instruction.

2. The method for atomic memory accesses in a processor system according to claim 1, wherein said step of speculatively executing said reservation instruction by placing a reservation for a particular data address of said first reservation instruction further comprises the steps of:

generating an address for said first reservation instruction for said execution unit;

sending the first reservation instruction address to a bus interface unit;

setting a reservation for said address of said first LARX instruction in said bus interface unit; and loading data from said address into a register.

3. The method for atomic memory accesses in a processor system according to claim 2, said method further comprising the steps of:

setting a conditional store instruction flag to indicate failure in said execution unit, in response to generating an address for said first reservation instruction;

signaling that said first reservation instruction is finished to a completion unit, in response to completion of loading said data from said address into said register;

determining if any previously set reservations are pending in said bus interface unit, in response to setting a reservation for said address of said first reservation instruction;

signaling to said execution unit that said first reservation instruction has completed execution, in response to completion of any previously set reservations; and setting said conditional store instruction flag to indicate passing in said execution unit, in response to signaling to said execution unit that said first reservation instruction has completed execution.

4. The method for atomic memory accesses in a processor system according to claim 1, said method further comprising the steps of:

issuing a partnering conditional store instruction to said execution unit;

determining if a reservation has been made for said partnering conditional store instruction which is still valid; and performing a store for said partnering conditional store instruction, in response to determining that said reservation for said partnering conditional store instruction is still valid, such that an atomic operation is completed.

5. The method for atomic memory accesses in a processor system according to claim 4, said step of determining if a reservation has been made for said partnering conditional store instruction which is still valid further comprising the steps of:

generating a data address for the intended store operation of said parterning conditional store instruction;

writing said data address to a store reorder queue in said execution unit;

waiting for any conditional store instructions in said store reorder queue which occur prior to said partnering conditional store instruction in said program order to be completed;

determining if a conditional store instruction flag in said execution unit indicates failure;

sending said partnering conditional store instruction to a bus interface unit with a pass condition set, in response to determining that said conditional store instruction flag in said execution unit does not indicate failure; and determining if a reservation for said parterning conditional store instruction data address is still valid in said bus interface unit.

6. A system for atomic memory accesses in a processor system, wherein said processor system is able to issue and execute a plurality of instructions out of order with respect to a particular program order, said system comprising:

an issue queue for holding instructions prior to issue;

an execution unit for receiving issued instructions from said issue queue;

means for speculatively issuing a first reservation instruction to an execution unit of a processor system;

means for flushing instructions queued for said execution unit which occur after said first reservation instruction in said program order, in response to detecting any previously executed reservation instructions in said execution unit which occur after said first reservation instruction in said program order; and means for speculatively executing said first reservation instruction by placing a reservation for a particular data address of said first reservation instruction, in response to completion of instructions queued for said execution unit which occur prior to said first reservation instruction in said program order, such that reservation instructions which are speculatively issued and executed in any order are executed in-order with respect to a partnering conditional store instruction.

7. The system for atomic memory accesses in a processor system according to claim 6, wherein said means for flushing instructions queued in said execution unit, in response to detecting any previously executed reservation instructions in said execution unit which occur after said first reservation instruction in said program order, further comprises:

a load reorder queue within said execution unit for saving the program order to executed reservation instructions;

means for detecting if any reservation instructions in said load reorder queue of said execution unit occur after said first reservation instruction in said program order.

8. The system for atomic memory accesses in a processor system according to claim 6, wherein said means for speculatively executing said first reservation instruction by placing a reservation for a particular data address of said first reservation instruction further comprises:

means for generating an address for said first reservation instruction in said execution unit;

a bus interface unit which accesses a bus interface through which memory storage is accessible;

means for sending the first reservation instruction address to a bus interface unit; and means for placing a reservation for said address of said first reservation instruction in said bus interface unit.

9. The system for atomic memory accesses in a processor system according to claim 8, said system further comprising:

means for setting a conditional store instruction flag to indicate failure in said execution unit, in response to generating an address for said first reservation instruction;

means for determining if any previously set reservations are pending in said bus interface unit, in response to setting a reservation for said address of said first reservation instruction;

means for signaling to said execution unit that said first LARX instruction has completed execution, in response to completion of all previously set reservations; and means for setting said conditional store instruction flag to indicate passing in said execution unit, in response to signaling to said execution unit that said first reservation instruction has completed execution.

10. The system for atomic memory accesses in a processor system according to claim 6, said system further comprising:

means for issuing a partnering conditional store instruction to said execution unit from said issue queue;

means for determining if a reservation has been made for said partnering conditional store instruction which is still valid; and means for performing a store for said partnering conditional store instruction, in response to determining that said reservation for said partnering conditional store instruction is still valid, such that an atomic operation is completed.

11. The system for atomic memory accesses in a processor system according to claim 10, said means for determining if a reservation has been made for said partnering conditional store instruction which is still valid further comprising:

means for generating a data address for the intended store operation of said partnering conditional store instruction;

a store reorder queue in said execution unit for holding pending conditional store instructions in said execution unit and executing said conditional store instructions in said program order;

means for writing said data address to a store reorder queue in said execution unit;

waiting for any conditional store instructions in said store reorder queue which occur prior to said partnering conditional store instruction is said program order to be completed;

determining if a conditional store instruction flag set in said execution unit indicates failure;

sending said partnering conditional store instruction to a bus interface unit with a pass condition set, in response to determining that said conditional store instruction flag in said execution unit does not indicate failure; and determining if a reservation for said partnering conditional store instruction data address is still valid in said bus interface unit.

\* \* \* \* \*